Figure 1:
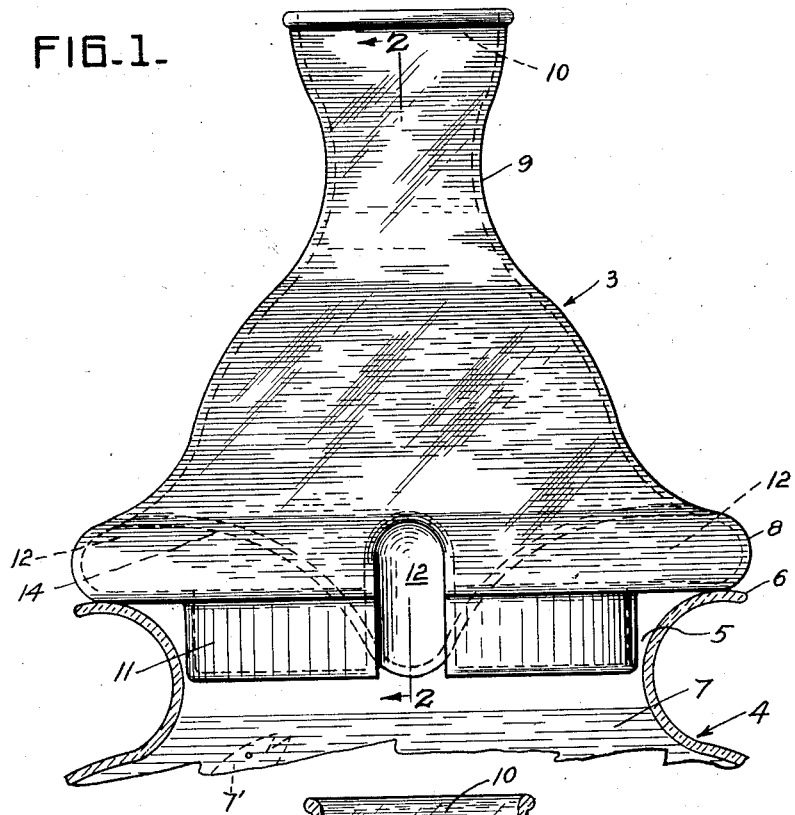

June 19, 1928.

M. JYUMI 1,674,046

CLOSURE FOR FISH BOWLS OR THE LIKE

Filed Oct. 10, 1927

INVENTOR.
Motogo Jyumi
BY M. C. Frank
ATTORNEY

Patented June 19, 1928.

1,674,046

UNITED STATES PATENT OFFICE.

MOTOGO JYUMI, OF OAKLAND, CALIFORNIA.

CLOSURE FOR FISH BOWLS OR THE LIKE.

Application filed October 10, 1927. Serial No. 225,371.

My present invention relates broadly to ornamental closures for ornamental vessels, and more particularly to vase-like closures for fishbowls and like vessels needing air for the preservation of the contents therein.

Fishbowls containing live fishes are ornamental articles in the present-day homes and elsewhere for pet and exhibition purposes. The plainness of the wide-mouthed fishbowl in common use is quite marked and in many instances is not in artistic harmony with the surrounding works of art, and, therefore because of this omission of artistic effect they are not in full favor with persons possessing a high degree of esthetic taste.

A further disadvantage of fishbowls containing live fish, is the fact that the common pet house cat very frequently catches the fish by thrusting her paw into the bowl through its wide open mouth. Therefore, an important object of my invention is to remove the constant temptation afforded the cat of catching the fish in this manner, by the provision of a closure for the bowl which prevents ingress to the cat, but yet admits currents of air into the bowl at all times.

Another object of my invention is to provide channels in the closure open to the atmosphere and to the interior of the bowl for the free circulation of air into and through the bowl for aerating the contents thereof.

Another important object of my invention is to make a closure of artistic configuration and vase-like in form for the reception of cut flowers or other decorative articles.

A further object of my invention is to provide a closure of the character designated with an extension to its base for the purpose of aligning the closure axially with the vessel closed thereby and to prevent the accidental displacement of the closure from its resting seat on the vessel.

And still a further object of my invention is to strive to increase the popularity of having fish in the home as pets, by providing an ornamental fishbowl closure designed to solve the ever present and menacing cat problem so destructive to the fish.

Other and ancillary objects of my invention will be suggested in the following description and in the use of the device of my invention. Certain of the objects or certain portions or combinations of the objects of my invention may be attained with the use of less than all its advantageous features, or with modifications within its purview. It is petitioned therefore, that my invention be limited only by the claims constituting its final determination.

Figure 2:
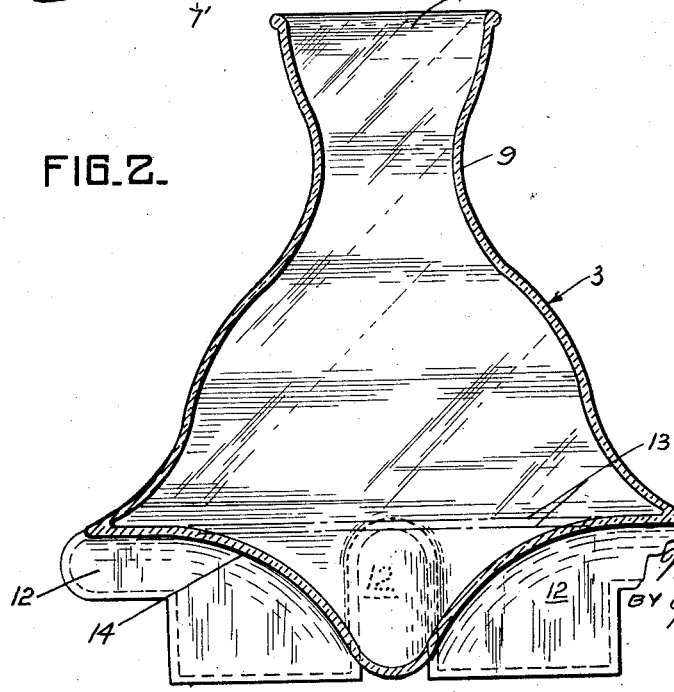

Referring to the drawings:

Figure 1 is an elevation of my improved closure in seated position upon the top of an ordinary fishbowl, the latter being but fragmentally shown and in section along a median plane thereof; and Fig. 2 is a median vertical section through the closure per se, the section being taken along the line 2—2 of Fig. 1.

I will now describe my invention in detail.

The numeral 3 indicates my closure per se, and in Fig. 1 it is shown in combination with the usual type of fishbowl 4, and for which my invention is designed to form a closure therefor.

The fishbowl or vessel 4 has the inherent wide-mouth opening 5 surrounded by the gracefully curved out-flaring top 6. As here shown, the contents of the vessel may be water indicated at 7 and covering fish represented by 7'.

The closure 3 may be composed of glass or other suitable material to harmonize with the objects in view of the purchaser thereof, and is preferably made hollow for the reception of growing plants, cut flowers or other preferred articles.

In the formation of the closure I provide it with a base 8, of a dimension approximating that of the vessel-top 6 and in harmonic configuration therewith. As here shown, the major balance of the closure is formed vase-like and terminates in a neck-portion 9 provided with an opening 10, which may be somewhat smaller in dimension than the opening 5 of the fishbowl 4.

The base 8 of the closure has a concentric base extension 11 formed thereon of a diameter approximating that of the opening 5 of the vessel 4, and is of comparatively shallow depth, simply extending enough to be loosely engaged within the said opening for axially aligning the closure 3 with the vessel 4, the combined unit presenting a structure of enhanced beauty over that of the vessel 4 standing alone.

The structure so far described does not meet the requirement for the life-preservation of the fish 7', or other contents that may be placed within the vessel but which need to be in continuous contact with circulating air for likewise preservation, such as lizards, frogs, etc., for laboratory purposes. Therefore, to meet this necessary requirement, I have provided the base 8 and its extension 11 with channels 12. These channels may radiate from the center of the base to the periphery thereof, or be straight and diametrically opposed as shown by the dot-and-dash lines 13 in Fig. 2. Preferably the closure is provided with a plurality of inverted channels that curve downwardly substantially at its vertical axis as shown clearly in Fig. 2, thus forming a deflecting surface 14 to deflect and direct currents of air passing through the channels into the interior of the vessel, whereby the desired circulation is produced. Channels straight across as indicated by the said dot-and-dash lines 13 may be preferably desirable in some instances where no water is in the vessel 4 to be aerated.

It is obvious that fishbowls and like vessels covered by the closure of my invention meet the cat-problem requirement quite effectively, and also relieves the tension on the mind of the owner of the fish as to whether or not the fish are safe with the cat about.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States, the following:

1. A closure for vessels needing air comprising a vase-like hollow body having its bottom formed with inverted channels therein for admitting air therethrough.

2. A closure for vessels needing air comprising a vase-like hollow body having its bottom formed with radially-disposed inverted channels therein for admitting air therethrough.

3. A closure for vessels needing air comprising a vase-like hollow body having its bottom formed with diametrically-opposed inverted channels curved downwardly at the vertical axis of the closure for admitting and deflecting air currents through said channels and into the vessel closed by said closure.

4. In combination with a fishbowl or the like vessel needing air, a closure of vase-like form having a base and base extension, said base being adapted to rest upon the top of the vessel and the said base extension to extend into the mouth of the vessel for aligning the closure with respect to said vessel, and said base and base extension provided with an inverted channel for admitting air into the vessel.

In testimony whereof I affix my signature.

MOTOGO JYUMI.